United States Patent
Wu et al.

(10) Patent No.: US 12,428,509 B2
(45) Date of Patent: Sep. 30, 2025

(54) COPOLYMERIZED PVDF RESIN FOR LITHIUM ION BATTERY BINDERS AND ITS PREPARATION METHOD

(71) Applicants: ZHEJIANG QUZHOU JUSU CHEMICAL INDUSTRY CO., LTD, Zhejiang (CN); Zhejiang Juhua Technology Center Co., Ltd, Zhejiang (CN); ZHEJIANG JUHUA CO., LTD.ELECTROCHEMISTRY PLANT, Zhejiang (CN)

(72) Inventors: Yupeng Wu, Zhejiang (CN); Jinming Han, Zhejiang (CN); Congli Ma, Zhejiang (CN); Zhigang Wu, Zhejiang (CN); Lanhui Su, Zhejiang (CN); Jinming Wang, Zhejiang (CN); Zhengliang Wang, Zhejiang (CN); Xinben Zhao, Zhejiang (CN)

(73) Assignees: ZHIEJIANG QUZHOU JUSU CHEMICAL INDUSTRY CO., LTD, Zhejiang (CN); Zhejiang Juhua Technology Center Co., Ltd, Zhejiang (CN); ZHEJIANG JUHUA CO., LTD. ELECTROCHEMISTRY PLANT, Zhejiang (CN)

( * ) Notice: Subject to any disclaimer, the term of this patent is extended or adjusted under 35 U.S.C. 154(b) by 792 days.

(21) Appl. No.: 17/764,982

(22) PCT Filed: Jun. 22, 2021

(86) PCT No.: PCT/CN2021/101494
§ 371 (c)(1),
(2) Date: Mar. 30, 2022

(87) PCT Pub. No.: WO2022/041977
PCT Pub. Date: Mar. 3, 2022

(65) Prior Publication Data
US 2022/0356280 A1 Nov. 10, 2022

(30) Foreign Application Priority Data

Aug. 26, 2020 (CN) .......................... 202010869825.2
Aug. 26, 2020 (CN) .......................... 202010869841.1

(51) Int. Cl.
*C08F 214/22* (2006.01)
*C08F 2/20* (2006.01)
*C08F 2/44* (2006.01)
*H01M 10/0525* (2010.01)

(52) U.S. Cl.
CPC .............. *C08F 214/22* (2013.01); *C08F 2/20* (2013.01); *C08F 2/44* (2013.01); *H01M 10/0525* (2013.01)

(58) Field of Classification Search
CPC .... C08F 214/22; C08F 14/22; C08F 214/225; C08F 2/20; H01M 4/623; C09D 127/16
See application file for complete search history.

(56) References Cited

U.S. PATENT DOCUMENTS

| | | | |
|---|---|---|---|
| 5,093,427 A | 3/1992 | Barber | |
| 6,265,507 B1 | 7/2001 | Wang et al. | |
| 2010/0133482 A1 | 6/2010 | Abusleme et al. | |
| 2010/0270509 A1 | 10/2010 | Sakuma et al. | |
| 2011/0111156 A1* | 5/2011 | Durali | C08F 214/22 428/36.9 |

FOREIGN PATENT DOCUMENTS

| | | | | |
|---|---|---|---|---|
| CN | 1267309 | | 9/2000 | |
| CN | 104497190 | | 4/2015 | |
| CN | 104530276 | | 4/2015 | |
| CN | 106450327 | | 2/2017 | |
| CN | 110797537 | | 2/2020 | |
| CN | 112159493 | | 1/2021 | |
| CN | 112159493 A | * | 1/2021 | .............. C08F 14/22 |
| CN | 112175127 | | 1/2021 | |
| CN | 112175127 A | * | 1/2021 | ................ C08F 2/20 |
| WO | WO-2018114753 A1 | * | 6/2018 | ................ C08F 2/20 |

OTHER PUBLICATIONS

Machine translation into English of CN-112159493-A (Year: 2021).*
Machine translation into English of CN-112175127-A (Year: 2021).*
"Search Report of Europe Counterpart Application", issued on Sep. 6, 2024, p. 1-p. 8.
"International Search Report (Form PCT/ISA/210) of PCT/CN2021/101494," mailed on Sep. 27, 2021, with English translation thereof, pp. 1-8.

* cited by examiner

*Primary Examiner* — Karuna P Reddy
(74) *Attorney, Agent, or Firm* — JCIPRNET

(57) ABSTRACT

Disclosed are a copolymerized PVDF resin for lithium battery binders and its preparation method. 300 to 600 parts of deionized water, 0.04 to 0.25 part of a pH buffer regulator, 85 to 99.5 parts of a vinylidene fluoride (VDF) monomer, 0.5 to 15 parts of a comonomer, 0.3 to 3 parts of a metallocene synergist, 0.2 to 1.0 part of an initiator, 0.08 to 0.35 part of a dispersant react at 40 to 65° C., 5.5-8.0 Mpa. At the end of the reaction, the unreacted monomers are recovered, and then the operations of washing, filtering, and drying are carried out to obtain the copolymerized PVDF resin. For the copolymerized PVDF resin for lithium battery binders, the binding of PVDF resin to a positive electrode active material and current collector is improved, and the rotational viscosity of the NMP solution and the preparation and dispersion requirements for PVDF resin slurry are reduced.

8 Claims, 4 Drawing Sheets

COPOLYMERIZED PVDF RESIN FOR LITHIUM ION BATTERY BINDERS AND ITS PREPARATION METHOD

CROSS-REFERENCE TO RELATED APPLICATION

This application is a 371 of international application of PCT application serial no. PCT/CN2021/101494, filed on Jun. 22, 2021, which claims the priority benefit of China application no. 202010869841.1, filed on Aug. 26, 2020 and China application no. 202010869825.2, filed on Aug. 26, 2020. The entirety of each of the above mentioned patent applications is hereby incorporated by reference herein and made a part of this specification.

TECHNICAL FIELD

This disclosure relates to a PVDF resin, and in particular to a copolymerized PVDF resin for lithium ion battery binders and its preparation method.

RELATED ART

Polyvinylidene fluoride (PVDF) resin is mainly used in an anode (positive electrode) binder in the application of lithium batteries. In the specific application formula, PVDF and NMP form a slurry, and a positive electrode active material (LFP, lithium manganate, or lithium cobalt oxide) and a conductive agent (SUPER_P conductive carbon black) are then added, and then the obtained mixture is applied to a current collector to make a lithium ion battery positive electrode material.

Now, in the lithium ion battery market, especially in power batteries, graft-modified PVDF resins are mainly used, such as Solvay 5130, 5140 and other PVDF resins. This polymer is usually dissolved in a solvent with a very high boiling point (202° C.) (N-Methylpyrrolidone, NMP). Although the polymer is very effective as a binder and electrochemically inert, it has substantial problems in industrial applications, such as high production costs and large energy requirements for evaporating solvents during electrode manufacturing. In addition, from an electrochemical point of view, its use in batteries with liquid electrolytes leads to the formation of LiF, which accelerates the chemical decomposition of PVDF. Another factor that accelerates the breakdown rate of the electrode is the lack of flexibility of PVDF; the shrinkage and expansion effects caused by the cycle form cracks in the electrode. Generally, the main methods to improve the bonding performance of PVDF, such as chemical grafting and radiation grafting, have technical problems such as high rotational viscosity of the NMP solution and high requirements for the preparation and dispersion of PVDF resin slurry.

For example, Chinese Patent Publication No. CN104530276A discloses a method for preparing a special PVDF resin for lithium ion battery binders, including: adding water and an emulsifier to a reactor, heating up, adding a vinylidene fluoride monomer, and increasing the pressure of the reactor to 2.0 to 4.2 Mpa, adding an initiator and a molecular weight regulator, and holding the temperature and pressure to carry out a polymerization reaction for 15 to 40 min; then, adding the initiator again, and when the monomer reaction volume reaches a predetermined weight, stopping the reaction; and separating and recovering the unreacted vinylidene fluoride monomer, and filtering and drying the remaining product, thus obtaining the PVDF resin. This method discloses the preparation method of a special PVDF homopolymer for lithium batteries. When the resin prepared by this method is used in lithium ion battery binders, there are problems such as high consumption of PVDF resin and poor bonding ability.

For another example, Chinese Patent Publication No. CN106450327A discloses a method for improving bonding performance of lithium ion battery polyvinylidene fluoride by irradiation. According to this invention, a chemical grafting modification method is adopted to prepare a lithium ion battery containing a PVDF binder, and the entire battery is placed under an electron accelerator or on a facility under the electron beam of a Denamex accelerator to irradiate the entire lithium ion battery (the radiation dose is 20 to 200 kGy, and the radiation dose rate is 50 to 15000 Gy/s) so that the PVDF is partially cross-linked, thereby changing its bonding performance, reducing the thickness expansion rate of the battery, increasing the capacity retention rate of the battery, and further improving the battery stability and extending the service life of the battery. The disadvantage of this method is that the rotational viscosity of the NMP solution is relatively high.

For another example, Chinese Patent Publication No. CN110797537A discloses a lithium-sulfur battery binder and a preparation method and application thereof, belonging to the technical field of lithium ion battery binders. The binder is composed of a methyl etherified amino resin and a solvent, and the concentration of the methyl etherified amino resin is 5 to 20 wt %. The binder is prepared by dispersing the methyl etherified amino resin in the solvent, heating the resulting solution to 30 to 80° C., and then cooling the solution to room temperature after the methyl etherified amino resin is completely dissolved. The binder of this invention has good mechanical properties and is beneficial to buffer electrode volume expansion; a large number of nitrogen-rich functional groups contained in the binder can capture polysulfides through chemical bonding, to well inhibit the shuttle effect of lithium polysulfide, and also promote the migration of lithium ions. The disadvantage of this invention is that there are technical problems such as high requirements for the preparation and dispersion of the resin slurry.

SUMMARY OF INVENTION

In order to overcome the shortcomings of the prior art, an objective of this disclosure is to provide a copolymerized PVDF resin for lithium ion battery binders and its preparation method. By optimizing the polymerization formula, the polymerization method, the polymerization reaction temperature, feeding method and other factors that affect the polymerization reaction, the bonding of the PVDF resin to the positive electrode active material and current collector is improved, and the rotational viscosity of the NMP solution and the preparation and dispersion requirements for the PVDF resin slurry are reduced.

In order to achieve the above-mentioned objective, a technical solution of this disclosure is as follows: a copolymerized PVDF resin for lithium ion battery binders, by weight, including:

85 to 99.5 parts of vinylidene fluoride monomer;
0.5 to 15 parts of a comonomer;
0.04 to 0.25 part of a pH buffer regulator;
0.3 to 3 parts of a metallocene synergist;
0.2 to 1.0 part of an initiator; and
0.08 to 0.35 part of a dispersant.

By weight, the metallocene synergist includes:
0.01 to 0.5 part of 4'-phenyl-2,2':6',2"-terpyridine;
0.1 to 1 part of cobalt isooctanoate;
10 to 25 parts of vinylpyrrolidone;
0.3 to 2 parts of vinylferrocene; and
100 to 150 parts of dimethylchlorohydrosilane.

As a preferred embodiment of this disclosure, the dispersant is one of or a mixture of more than one of methyl cellulose, hydroxypropyl methyl cellulose, carboxymethyl cellulose, and methyl cellulose ether.

As a preferred embodiment of this disclosure, the pH buffer regulator is one of or a mixture of more than one of disodium dihydrogen phosphate, disodium hydrogen phosphate, sodium pyrophosphate, sodium bicarbonate, and ammonium acetate.

As a preferred embodiment of this disclosure, the initiator is one of or a mixture of more than one of diethylhexyl peroxydicarbonate, tert-butyl peroxyneodecanoate, diisopropyl peroxydicarbonate, lauryl peroxide, dibenzoyl peroxide, and tert-butyl peroxy-2-ethylhexanoate.

As a preferred embodiment of the disclosure, the comonomer is one of or a mixture of more than one of vinyl chloride, methyl methacrylate, 2-ethylhexyl acrylate, acrylic acid, methacrylic acid, acrylonitrile, methyl acrylate, butyl acrylate, butyl methacrylate, and 2-ethylhexyl methacrylate.

In order to achieve the above objective, a second technical solution of this disclosure is as follows: a preparation method of a copolymerized PVDF resin for lithium ion battery binders, including the following steps:

(1) preparing reaction raw materials for later use: by weight, the reaction raw materials including: 300 to 600 parts of deionized water, 0.04 to 0.25 part of a pH buffer regulator, 85 to 99.5 parts of a VDF monomer, 0.5 to 15 parts of a comonomer, 0.3 to 3 parts of a metallocene synergist, 0.2 to 1.0 part of an initiator, and 0.08 to 0.35 part of a dispersant;

(2) preparing an aqueous solution of the pH buffer regulator and an aqueous solution of the dispersant: using the pH buffer regulator and 0.3 to 5 wt % of deionized water to prepare the aqueous solution of the pH buffer regulator for later use; and using the dispersant and 10 to 40 wt % of deionized water to prepare the aqueous solution of the dispersant for later use;

(3) adding the remaining deionized water and the aqueous solution of the pH buffer regulator and the aqueous solution of the dispersant obtained in step (2) to a reactor, reducing a temperature in the reactor to 8 to 12° C., vacuumizing the reactor, and replacing with nitrogen to control an oxygen content in the reactor to ≤20 ppm;

(4) adding the initiator, the comonomer, the metallocene synergist and 10 to 30 wt % of the VDF monomer to the reactor; and (5) heating the reactor up to 40 to 65° C. to carry out a polymerization reaction, and controlling a polymerization pressure at 5.5 to 8.0 MPa by adding the remaining VDF monomer during the reaction; then, holding the temperature of the reactor and continuing the reaction; when a reactor pressure drops to 4.0 MPa, cooling down to stop the reaction; recovering the unreacted monomers, and then carrying out washing, filtering, and drying, thus obtaining a copolymerized PVDF resin.

As a preferred embodiment of this disclosure, the metallocene synergist is prepared by the following method.

By weight, preparing 0.01 to 0.5 part of 4'-phenyl-2,2':6',2"-terpyridine, 0.1 to 1 part of cobalt isooctanoate, 10 to 25 parts of vinylpyrrolidone, 0.3 to 2 parts of vinylferrocene, and 100 to 150 parts of dimethylchlorohydrosilane to carry out hydrosilylation for 1 to 5 h at 25 to 40° C. to obtain the metallocene synergist.

By optimizing the polymerization formula and by optimizing the polymerization reaction temperature and pressure, polymerization formula, feeding method and other factors that affect the polymerization reaction, the binding of the PVDF resin to the positive electrode active material and current collector is improved, and the rotational viscosity of the NMP solution and the preparation and dispersion requirements for the PVDF resin slurry are reduced.

When the dosage of terpyridine derivative is less than that of cobalt salt, it can promote catalysis to some extent, thus improving the catalytic performance of the cobalt salt. The presence of vinylpyrrolidone is conducive to the formation of the addition products and improves the selectivity of the addition product, and the vinylpyrrolidone can form host-guest interactions with ferrocene. In addition, the functionally active group pyrrolyl on the vinylpyrrolidone is linked to a molecular chain of a polymer by a chemical bond to act as a cross-linking agent to form a three-dimensional network structure, thereby improving the flexibility of PVDF, overcoming the factors that accelerate the electrode breakdown speed, avoiding the phenomenon of cracks in the electrode caused by the shrinkage and expansion effects caused by cycles, and improving the comprehensive mechanical properties of the PVDF resin.

The copolymerized PVDF resin for lithium batteries in this disclosure is particularly suitable for binders for positive electrode materials of lithium batteries, especially power batteries.

The melting point mentioned in this disclosure refers to the temperature at which the peak reaches the maximum value when the resin changes from a solid state to a liquid with different viscosities. The melting point can be measured by conventional methods in the art, such as differential scanning calorimetry (DSC); apparent density is measured by a cup method; rotational viscosity is measured by a rotational viscometer.

Compared with the prior art, this disclosure has the following beneficial effects.

1. According to this disclosure, the preparation and dispersion requirements for the PVDF resin slurry are reduced, and the melting point of the PVDF resin of this disclosure is greater than 168° C.
2. According to this disclosure, the rotational viscosity of the NMP solution is reduced. The PVDF resin of this disclosure has an inherent viscosity ≥2.35 dl/g and an apparent density between 0.30 g/mL and 0.6 g/mL, and the 10% NMP solution has a rotational viscosity between 5000 mPa·s and 7000 mPa·s.
3. According to this disclosure, the bonding performance of the PVDF resin to the positive electrode active material and the current collector is improved. After the PVDF resin prepared according to this disclosure is used to produce for a binder for positive electrode materials of lithium batteries, especially power batteries, the peeling strength of the binder is greater than 27 N/m.
4. According to this disclosure, the mechanical performance of PVDF acting as a binder for battery positive electrode is improved. The vinyl pyrrolidone in the PVDF resin of this disclosure can form host-guest interactions with ferrocene. In addition, the functionally active group pyrrolyl on the vinylpyrrolidone is linked to a molecular chain of a polymer by a chemical bond to act as a cross-linking agent to form a three-dimensional network structure, thereby improving the flexibility of PVDF, overcoming the factors that accelerate the electrode breakdown speed, and avoiding the phenomenon of cracks in the electrode caused by the shrinkage and expansion effects caused by cycles.

5. In the practical application of lithium batteries, the resin of this disclosure reduces the internal resistance of the lithium ion battery to 41 mΩ, or below and improves the capacity retention rate of the lithium ion battery to 85.1% or above.

DESCRIPTION OF EMBODIMENTS

Figure 1:
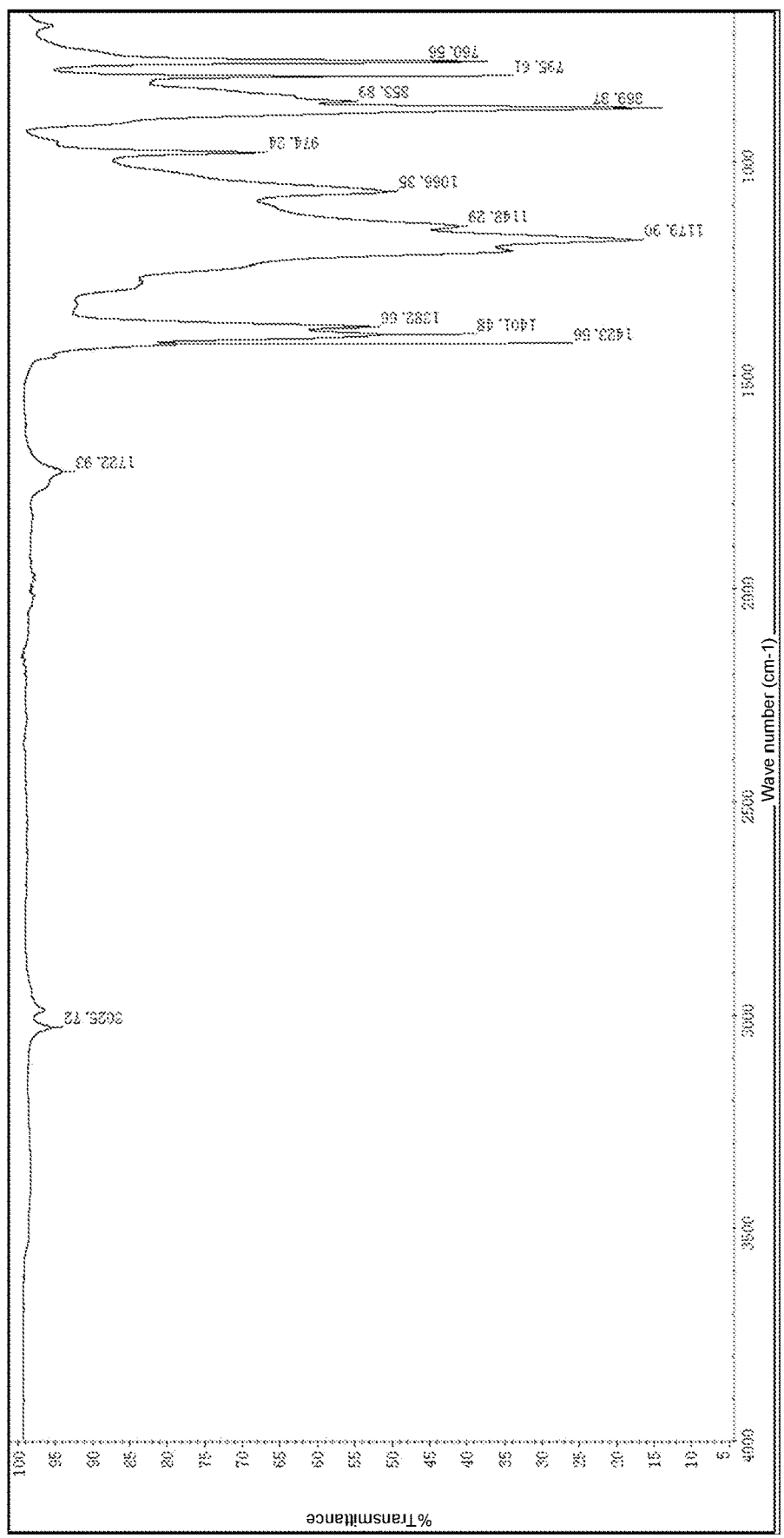
FIG. 1 is an infrared absorption spectrum of a PVDF sample of example 1, where, 1401 $cm^{-1}$ represents the deformation vibration absorption peak of $CH_2$ linked to $CF_2$ in PVDF; 1180 $cm^{-1}$ represents the stretching vibration absorption peak of $CF_2$; the sharp absorptions at 974 $cm^{-1}$, 854 $cm^{-1}$, 796 $cm^{-1}$, and 761 $cm^{-1}$ are the vibration absorption peaks of the crystalline phase; 870 $cm^{-1}$ represents the characteristic absorption peak of the amorphous phase.
Figure 2:
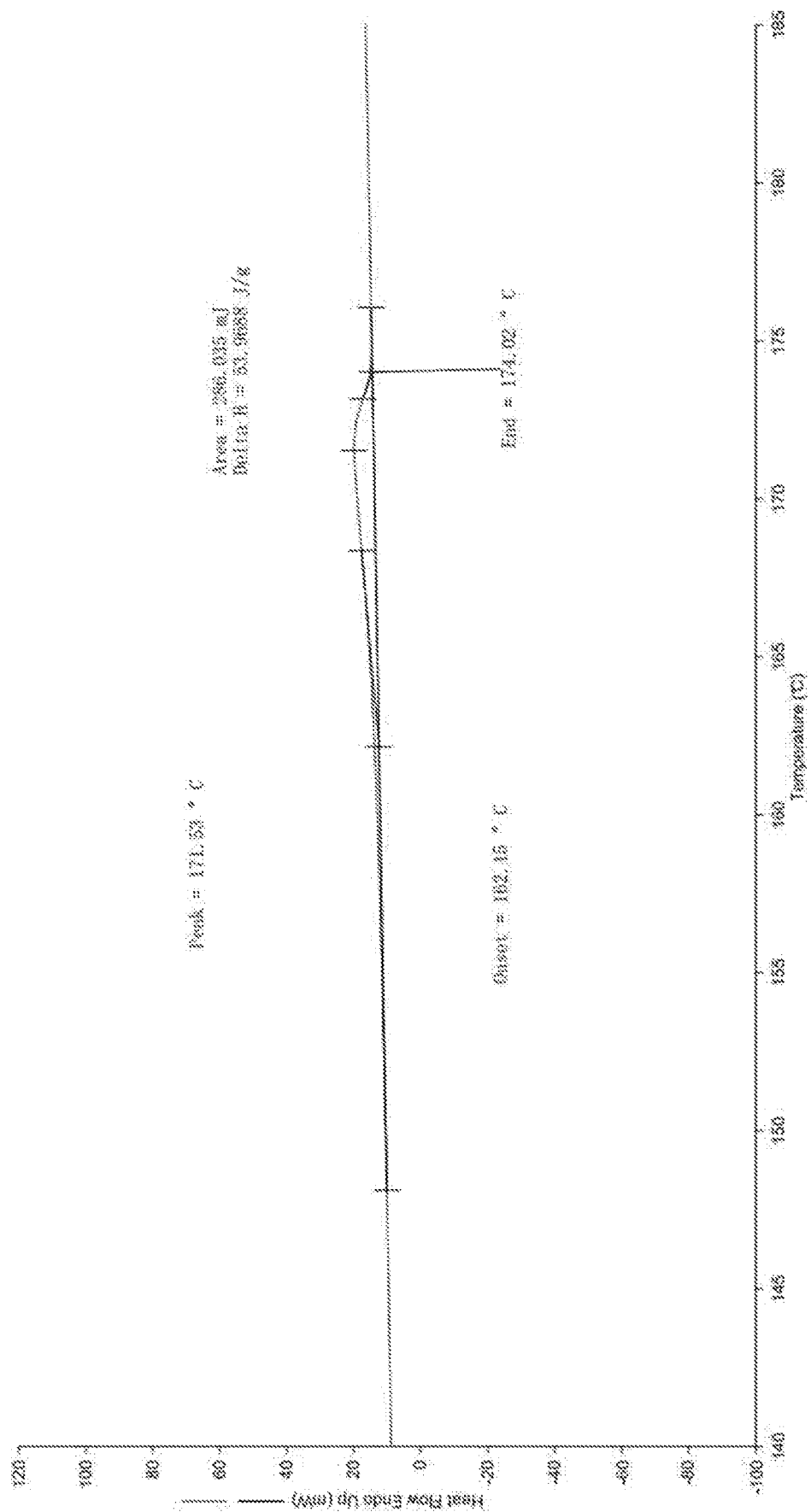
FIG. 2 is a first heating endothermic spectrum of the resin sample of example 1.
Figure 3:
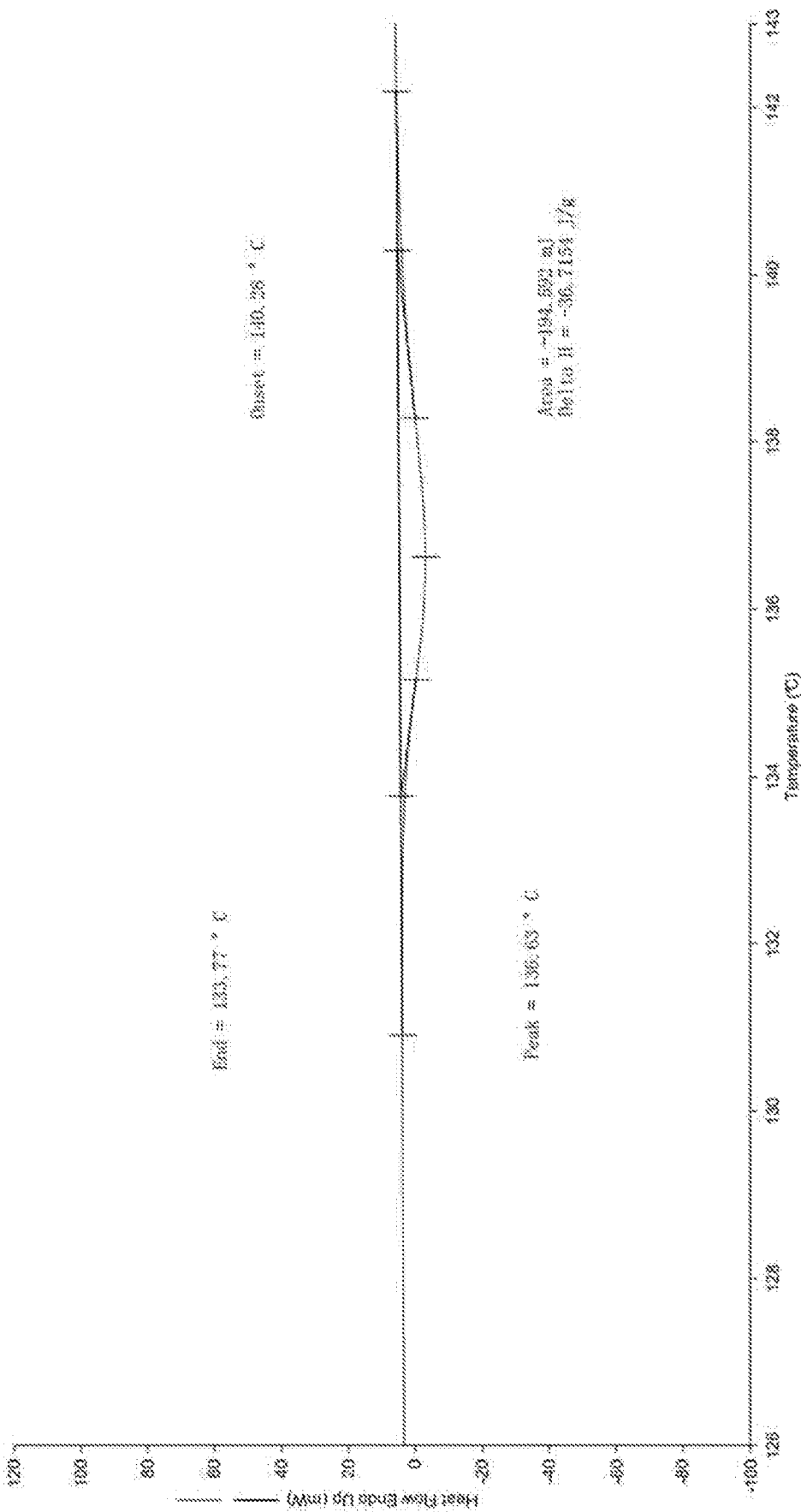
FIG. 3 is the cooling exothermic curve of the resin sample of example 1 after the first heating.
Figure 4:
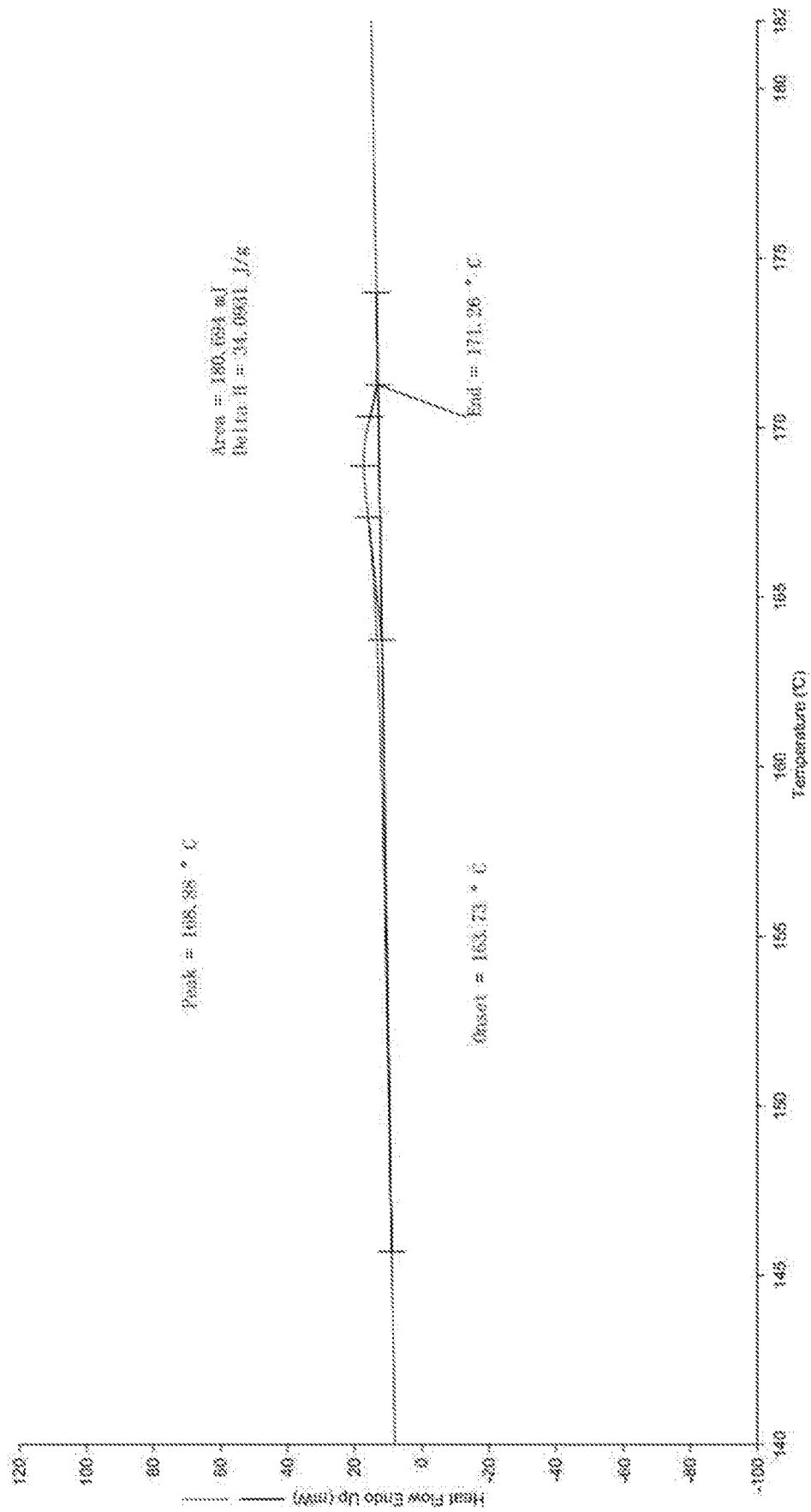
FIG. 4 is a second heating endothermic diagram of the resin sample of example 1.

In order to make the objectives, technical solutions and advantages of this disclosure clearer, this disclosure will be further described in detail below in conjunction with embodiments. It should be understood that the following description is only used to explain this disclosure, and is not intended to limit this disclosure.

Example 1

A preparation method of a copolymerized PVDF resin for lithium ion battery binders, including the following steps:
(1) preparing a metallocene synergist: based on 1 kg as a part, adding 0.01 kg of 4'-phenyl-2,2':6',2"-terpyridine, 0.1 kg of cobalt isooctanoate, 10 kg of vinylpyrrolidone, 0.3 kg of vinylferrocene, 100 kg of dimethylchlorohydrosilane to a reactor to carry out hydrosilylation for 3 h at 25° C. to obtain 66.2 kg of the metallocene synergist; taking 0.3 kg of the metallocene synergist for later use;
(2) preparing reaction raw materials for later use: based on 1 kg as a part, the reaction raw materials including:
300 kg of deionized water;
a pH buffer regulator: 0.04 kg of disodium dihydrogen pyrophosphate;
85 kg of vinylidene fluoride (VDF) monomer;
comonomers:
0.3 kg of vinyl chloride;
0.2 kg of 2-ethylhexyl acrylate;
an initiator: 0.2 kg of dethylhexyl peroxydicarbonate;
a dispersant: 0.08 kg of methyl cellulose;
0.3 kg of a metallocene synergist;
(3) preparing an aqueous solution of the pH buffer regulator and an aqueous solution of the dispersant: using 0.04 kg of the pH buffer regulator disodium dihydrogen pyrophosphate and 15 kg of deionized water to prepare the aqueous solution of the pH buffer regulator for later use; and using 0.08 kg of the dispersant methyl cellulose and 30 kg of deionized water to prepare the aqueous solution of the dispersant for later use;
(4) adding the remaining deionized water and the aqueous solution of the pH buffer regulator and the aqueous solution of the dispersant obtained in step (3) to the reactor, reducing a temperature in the reactor to 10° C., vacuumizing the reactor, and replacing with nitrogen to control an oxygen content in the reactor to ≤20 ppm;
(5) adding 0.2 kg of the initiator diethylhexyl peroxydicarbonate, the comonomers (0.3 kg of vinyl chloride and 0.2 kg of 2-ethylhexyl acrylate), 0.3 kg of the metallocene synergist and 8.5 kg of the VDF monomer; and
(6) heating the reactor up to 50° C. to carry out a polymerization reaction, and controlling a polymerization pressure at 6.0 MPa by adding the remaining VDF monomer during the reaction; then, holding the temperature of the reactor and continuing the reaction; when a reactor pressure drops to 4.0 MPa, cooling down to stop the reaction; recovering the unreacted monomers, and then carrying out washing, filtering, and drying, thus obtaining a copolymerized PVDF resin.

Example 2

A preparation method of a copolymerized PVDF resin for lithium ion battery binders, including the following steps:
(1) preparing a metallocene synergist: based on 1 kg as a part, adding 0.05 kg of 4'-phenyl-2,2':6',2"-terpyridine, 0.2 kg of cobalt isooctanoate, 19 kg of vinylpyrrolidone, 0.7 kg of vinylferrocene, 122 kg of dimethylchlorohydrosilane to a reactor to carry out hydrosilylation for 2 h at 28° C. to obtain 71.8 kg of the metallocene synergist; taking 0.9 kg of the metallocene synergist for later use;
(2) preparing reaction raw materials for later use: based on 1 kg as a part, the reaction raw materials including:
500 kg of deionized water;
a pH buffer regulator: 0.11 kg of disodium phosphate;
88 kg of VDF monomer;
comonomers:
3 kg of methyl methacrylate;
2 kg of butyl methacrylate;
2 kg of 2-ethylhexyl methacrylate;
an initiator: 0.6 kg of tert-butyl peroxide neodecanoate;
a dispersant: 0.13 kg of hydroxypropyl methyl cellulose;
0.9 kg of a metallocene synergist;
(3) preparing an aqueous solution of the pH buffer regulator and an aqueous solution of the dispersant: using 0.11 kg of the pH buffer regulator disodium phosphate and 15 kg of deionized water to prepare the aqueous solution of the pH buffer regulator for later use; and using 0.13 kg of the dispersant hydroxypropyl methyl cellulose and 100 kg of deionized water to prepare the aqueous solution of the dispersant for later use;
(4) adding the remaining deionized water and the aqueous solution of the pH buffer regulator and the aqueous solution of the dispersant obtained in step (3) to the reactor, reducing a temperature in the reactor to 8° C., vacuumizing the reactor, and replacing with nitrogen to control an oxygen content in the reactor to ≤20 ppm;
(5) adding 0.6 kg of the initiator tert-butyl peroxide neodecanoate, the comonomers (3 kg of methyl methacrylate, 2 kg of butyl methacrylate, and 2 kg of 2-ethylhexyl methacrylate), 0.9 kg of the metallocene synergist and 26.4 kg of the VDF monomer; and (6) heating the reactor up to 40° C. to carry out a polymerization reaction, and controlling a polymerization pressure at 5.5 MPa by adding the remaining VDF monomer during the reaction; then, holding the temperature of the reactor and continuing the reaction; when a reactor pressure drops to 4.0 MPa, cooling down to stop the reaction; recovering the unreacted monomers, and then carrying out washing, filtering, and drying, thus obtaining a copolymerized PVDF resin.

Example 3

A preparation method of a copolymerized PVDF resin for lithium ion battery binders, including the following steps:

(1) preparing a metallocene synergist: based on 1 kg as a part, adding 0.5 kg of 4'-phenyl-2,2':6',2"-terpyridine, 1 kg of cobalt isooctanoate, 25 kg of vinylpyrrolidone, 2 kg of vinylferrocene, 150 kg of dimethylchlorohydrosilane to a reactor to carry out hydrosilylation for 5 h at 40° C. to obtain 95 kg of the metallocene synergist; taking 3 kg of the metallocene synergist for later use;

(2) preparing reaction raw materials for later use: based on 1 kg as a part, the reaction raw materials including:
600 kg of deionized water;
a pH buffer regulator: 0.25 kg of sodium pyrophosphate;
99.5 kg of VDF monomer;
comonomers:
    5 kg of acrylic acid;
    10 kg of methacrylic acid;
initiators:
    0.5 kg of diisopropyl peroxydicarbonate;
    0.5 kg of lauryl peroxide;
a dispersant: 0.35 kg of carboxymethyl cellulose;
3 kg of a metallocene synergist;

(3) preparing an aqueous solution of the pH buffer regulator and an aqueous solution of the dispersant: using 0.25 kg of the pH buffer regulator sodium pyrophosphate and 6 kg of deionized water to prepare the aqueous solution of the pH buffer regulator for later use; and using 0.35 kg of the dispersant carboxymethyl cellulose and 180 kg of deionized water to prepare the aqueous solution of the dispersant for later use;

(4) adding the remaining deionized water and the aqueous solution of the pH buffer regulator and the aqueous solution of the dispersant obtained in step (3) to the reactor, reducing a temperature in the reactor to 12° C., vacuumizing the reactor, and replacing with nitrogen to control an oxygen content in the reactor to ≤20 ppm;

(5) adding the initiators (0.5 kg of diisopropyl peroxydicarbonate and 0.5 kg of lauryl peroxide), the comonomers (5 kg of acrylic acid and 10 kg of methacrylic acid), 3 kg of the metallocene synergist and 19.9 kg of the VDF monomer; and (6) heating the reactor up to 60° C. to carry out a polymerization reaction, and controlling a polymerization pressure at 7.0 MPa by adding the remaining VDF monomer during the reaction; then, holding the temperature of the reactor and continuing the reaction; when a reactor pressure drops to 4.0 MPa, cooling down to stop the reaction; recovering the unreacted monomers, and then carrying out washing, filtering, and drying, thus obtaining a copolymerized PVDF resin.

Example 4

A preparation method of a copolymerized PVDF resin for lithium ion battery binders, including the following steps:

(1) preparing a metallocene synergist: based on 1 kg as a part, adding 0.1 kg of 4'-phenyl-2,2':6',2"-terpyridine, 0.5 kg of cobalt isooctanoate, 20 kg of vinylpyrrolidone, 1 kg of vinylferrocene, 110 kg of dimethylchlorohydrosilane to a reactor to carry out hydrosilylation for 1 h at 35° C. to obtain 73.7 kg of the metallocene synergist; taking 2 kg of the metallocene synergist for later use;

(2) preparing reaction raw materials for later use: based on 1 kg as a part, the reaction raw materials including:
300 kg of deionized water;
pH buffer regulators:
    0.05 kg of sodium bicarbonate;
    0.2 kg of ammonium acetate;
85 kg of VDF monomer;
8 kg of a comonomer: acrylonitrile;
initiators:
    0.1 kg of dibenzoyl peroxide;
    0.1 kg of tert-butyl peroxy-2-ethylhexanoate;
a dispersant: 0.35 kg of methyl cellulose ether;
2 kg of a metallocene synergist;

(3) preparing an aqueous solution of the pH buffer regulators and an aqueous solution of the dispersant: using the pH buffer regulators (0.05 kg of sodium bicarbonate and 0.2 kg of ammonium acetate) and 1.5 kg of deionized water to prepare the aqueous solution of the pH buffer regulators for later use; and using 0.35 kg of the dispersant methyl cellulose ether and 120 kg of deionized water to prepare the aqueous solution of the dispersant for later use;

(4) adding the remaining deionized water and the aqueous solution of the pH buffer regulators and the aqueous solution of the dispersant obtained in step (3) to the reactor, reducing a temperature in the reactor to 9° C., vacuumizing the reactor, and replacing with nitrogen to control an oxygen content in the reactor to ≤20 ppm;

(5) adding the initiators (0.1 kg of dibenzoyl peroxide and 0.1 kg of tert-butyl peroxy-2-ethylhexanoate), 8 kg of the comonomer acrylonitrile, 2 kg of the metallocene synergist and 25.5 kg of the VDF monomer; and (6) heating the reactor up to 65° C. to carry out a polymerization reaction, and controlling a polymerization pressure at 8.0 MPa by adding the remaining VDF monomer during the reaction; then, holding the temperature of the reactor and continuing the reaction; when a reactor pressure drops to 4.0 MPa, cooling down to stop the reaction; recovering the unreacted monomers, and then carrying out washing, filtering, and drying, thus obtaining a copolymerized PVDF resin.

Comparative Example 1

A preparation method of a copolymerized PVDF resin for lithium ion battery binders, including the following steps:

(1) preparing reaction raw materials for later use: based on 1 kg as a part, the reaction raw materials including 300 kg of deionized water, 100 kg of vinylidene fluoride (VDF) monomer, 0.1 kg of tert-butyl peroxyneodecanoate serving as an initiator, and 0.2 kg of methyl cellulose serving as a dispersant;

(2) preparing an aqueous solution of the dispersant: using 0.2 kg of the dispersant methyl cellulose and 30 kg of deionized water to prepare the aqueous solution of the dispersant;

(3) adding the remaining deionized water and the aqueous solution of the dispersant obtained in step (2) to a reactor, reducing a temperature in the reactor to 10° C., vacuumizing the reactor, and replacing with nitrogen to control an oxygen content in the reactor to ≤20 ppm;

(4) adding 100 kg of the VDF monomer and 0.1 kg of the initiator tert-butyl peroxyneodecanoate into the reactor; and (5) heating the materials in the reactor up to 50° C. to carry out a polymerization reaction, and controlling a polymerization pressure at 6 MPa until a significant pressure drop occurs; when a reactor pressure drops to 4.0 MPa, cooling down to stop the reaction; recovering the unreacted monomer, and then carrying out washing, filtering, and drying, thus obtaining a copolymerized PVDF resin.

Comparative Example 2

A preparation method of a copolymerized PVDF resin for lithium ion battery binders, including the following steps:

(1) preparing a metallocene synergist: based on 1 kg as a part, adding 0.05 kg of 4'-phenyl-2,2':6',2"-terpyridine, 0.2 kg of cobalt isooctanoate, and 19 kg of vinylpyrrolidone, 122 kg of dimethylchlorohydrosilane to a reactor to carry out hydrosilylation for 3 h at 25° C. to obtain 70.1 kg of the metallocene synergist; taking 0.3 kg of the metallocene synergist for later use;

(2) preparing reaction raw materials for later use: based on 1 kg as a part, the reaction raw materials including 300 kg of deionized water, 100 kg of vinylidene fluoride (VDF) monomer, 0.1 kg of tert-butyl peroxyneodecanoate serving as an initiator, 0.2 kg of methyl cellulose serving as a dispersant, and 0.3 kg of the metallocene synergist;

(3) preparing an aqueous solution of the dispersant: using 0.2 kg of the dispersant methyl cellulose and 30 kg of deionized water to prepare the aqueous solution of the dispersant;

(4) adding the remaining deionized water and the aqueous solution of the dispersant obtained in step (3) to the reactor, reducing a temperature in the reactor to 10° C., vacuumizing the reactor, and replacing with nitrogen to control an oxygen content in the reactor to ≤20 ppm;

(5) adding 100 kg of the VDF monomer, 0.1 kg of the initiator tert-butyl peroxyneodecanoate, and 0.3 kg of the metallocene synergist into the reactor; and (6) heating the materials in the reactor up to 50° C. to carry out a polymerization reaction, and controlling a polymerization pressure at 6 MPa until a significant pressure drop occurs; when a reactor pressure drops to 4.0 MPa, cooling down to stop the reaction; recovering the unreacted monomer, and then carrying out washing, filtering, and drying, thus obtaining a copolymerized PVDF resin.

Comparative Example 3

A preparation method of a copolymerized PVDF resin for lithium ion battery binders, including the following steps:

(1) preparing a metallocene synergist: based on 1 kg as a part, adding 0.2 kg of cobalt isooctanoate, 19 kg of vinylpyrrolidone, 0.7 kg of vinylferrocene, and 122 kg of dimethylchlorohydrosilane to a reactor to carry out hydrosilylation for 3 h at 25° C. to obtain 75.2 kg of the metallocene synergist; taking 0.3 kg of the metallocene synergist for later use;

(2) preparing reaction raw materials for later use: based on 1 kg as a part, the reaction raw materials including 300 kg of deionized water, 100 kg of vinylidene fluoride (VDF) monomer, 0.1 kg of tert-butyl peroxyneodecanoate serving as an initiator, 0.2 kg of methyl cellulose serving as a dispersant, and 0.3 kg of the metallocene synergist;

(3) preparing an aqueous solution of the dispersant: using 0.2 kg of the dispersant methyl cellulose and 30 kg of deionized water to prepare the aqueous solution of the dispersant;

(4) adding the remaining deionized water and the aqueous solution of the dispersant obtained in step (3) to the reactor, reducing a temperature in the reactor to 10° C., vacuumizing the reactor, and replacing with nitrogen to control an oxygen content in the reactor to ≤20 ppm;

(5) adding 100 kg of the VDF monomer, 0.1 kg of the initiator tert-butyl peroxyneodecanoate, and 0.3 kg of the metallocene synergist into the reactor; and (6) heating the materials in the reactor up to 50° C. to carry out a polymerization reaction, and controlling a polymerization pressure at 6 MPa until a significant pressure drop occurs; when a reactor pressure drops to 4.0 MPa, cooling down to stop the reaction; recovering the unreacted monomer, and then carrying out washing, filtering, and drying, thus obtaining a copolymerized PVDF resin.

Comparative Example 4

A preparation method of a copolymerized PVDF resin for lithium ion battery binders, including the following steps:

(1) preparing a metallocene synergist: based on 1 kg as a part, adding 0.05 kg 4'-phenyl-2,2':6',2"-terpyridine, 0.2 kg of cobalt isooctanoate, 0.7 kg of vinyl ferrocene, and 122 kg of dimethylchlorohydrosilane to a reactor to carry out hydrosilylation for 3 h at 25° C. to obtain 62.7 kg of the metallocene synergist; taking 0.3 kg of the metallocene synergist for later use;

(2) preparing reaction raw materials for later use: based on 1 kg as a part, the reaction raw materials including 300 kg of deionized water, 100 kg of vinylidene fluoride (VDF) monomer, 0.1 kg of tert-butyl peroxyneodecanoate serving as an initiator, 0.2 kg of methyl cellulose serving as a dispersant, and 0.3 kg of the metallocene synergist;

(3) preparing an aqueous solution of the dispersant: using 0.2 kg of the dispersant methyl cellulose and 30 kg of deionized water to prepare the aqueous solution of the dispersant;

(4) adding the remaining deionized water and the aqueous solution of the dispersant obtained in step (3) to the reactor, reducing a temperature in the reactor to 10° C., vacuumizing the reactor, and replacing with nitrogen to control an oxygen content in the reactor to ≤20 ppm;

(5) adding 100 kg of the VDF monomer, 0.1 kg of the initiator tert-butyl peroxyneodecanoate, and 0.3 kg of the metallocene synergist into the reactor; and (6) heating the materials in the reactor up to 50° C. to carry out a polymerization reaction, and controlling a polymerization pressure at 6 MPa until a significant pressure drop occurs; when a reactor pressure drops to 4.0 MPa, cooling down to stop the reaction; recovering the unreacted monomer, and then carrying out washing, filtering, and drying, thus obtaining a copolymerized PVDF resin.

Performance Test

The properties of the PVDF resin samples obtained in Examples 1 to 4, the PVDF resin samples obtained in Comparative Examples 1 to 4 and the commercially available PVDF product JH-D2500 copolymerized resin were tested respectively. The specific properties are shown in Table 1, which are as follow.

1. Determination of Resin Melting Point

Differential scanning calorimeter (DSC8000, USA) was used. The sample was heated from room temperature to 220° C. at a temperature rise rate of 40° C./min, then held at the constant temperature for 3 min, and then cooled to 40° C. at a rate of 10° C./min, and then heated to 220° C. at a rate of 10° C./min. The peak value of the melting peak obtained by the second heating was regarded as the melting point of the sample.

2. Determination of Apparent Density

Apparent density was measured by the cup method to characterize the degree of looseness and compactness of the resin.

3. Determination of Inherent Viscosity

Capillary flow method: a quantitative amount of PVDF was dissolved in DMAc solvent to prepare a dilute solution, and then the inherent viscosity was measured by a capillary viscometer. When the solution flew out due to gravity, the viscosity was calculated by the Poiseuille formula.

4. Determination of Rotational Viscosity

The resin sample was dispersed in NMP to prepare an 8% solution, and then its rotational viscosity was measured using a continuous induction viscometer with No. 2 rotor, for 90 s at a constant temperature of 25° C. and at 10 rpm.

5. Determination of Peel Strength

The PVDF resin samples obtained in Examples 1 to 4, the PVDF resin samples obtained in Comparative Examples 1 to 4, and the commercially available PVDF product JH-D2500 copolymerized resin were respectively dissolved in DMAc solvent and prepared into 8% solutions. The above solutions were applied to a clean copper plate separately, and rested at 60° C. for 24 h. After the films were formed, the films were adhered to the surface of a sheet positive electrode with transparent tape, and cut into 200*40 mm sample strips for 180° peel strength test.

6. Determination of Infrared Spectrum

Pressing method: PVDF powder and an appropriate amount of potassium bromide powder were put in an agate mortar and then carefully ground so that they were dispersed evenly. The obtained mixture was then put into a pressing mold, and the mold was then placed on a hydraulic press to press the mixture into a sheet. The sheet was then mounted on a sample holder of the infrared spectrometer (Is50 FT-IR), and the infrared spectroscopy then was performed.

7. Li-Ion Battery Performance Test (1) Preparation of Lithium Ion Battery:

step 1: preparation of a sheet positive electrode for a lithium ion battery. The positive electrode active material $LiCoO_2$, the PVDF binder and conductive carbon black were mixed in N-methylpyrrolidone solvent at a mass ratio of 95:3:2 and the mixed solution was then stirred thoroughly to obtain a positive electrode slurry. The obtained positive electrode slurry was then applied to a 0.2 mm positive electrode current collector, dried, and cold pressed to obtain a sheet with a compact density of 1.6 $g/cm^3$; then, the sheet was cut and tabs were welded on the sheet to obtain a sheet positive electrode;

step 2: Preparation of a sheet anode for the lithium ion battery. A carbon anode material, the PVDF binder and a conductive agent were mixed in N-methylpyrrolidone solvent at a mass ratio of 95:3:2, and the mixed solution was then mixed thoroughly to obtain an anode slurry. The obtained anode slurry was then applied to an anode current collector, such as copper foil, and then dried to form an anode diaphragm. The anode diaphragm was then cold pressed and cut and tabs were welded on the anode diaphragm to obtain a sheet anode;

step 3: preparation of an electrolyte for the lithium ion battery. Ethylene carbonate (EC), ethyl methyl carbonate (EMC) and dimethyl carbonate (DMC) were mixed thorougly at a ratio of 2:1:7, and 16 wt % lithium hexafluorophosphate was then added as a solute to obtain an electrolyte;

step 4: preparation of a diaphragm: polyethylene porous diaphragm was used and the thickness of the porous membrane was 16 μm.

step 5: assembly of the lithium ion battery. The obtained sheet positive electrode, sheet anode and the diaphragm are wound in sequence to obtain a cell, and the cell was then top-sealed and side-sealed with an aluminum film, leaving a liquid injection port to be filled with electrolyte, and then processes such as formation and capacity were carried out to obtain the lithium ion battery.

The PVDF resin products obtained in Examples 1 to 4, the PVDF resin products obtained in Comparative Examples 1 to 4, and the commercially available PVDF product JH-D2500 copolymerized resin were used as PVDF binders for manufacturing of electrode plates, and the electrode plates were then assembled into batteries. The electrical properties of the batteries were then tested. The specific properties are shown in Table 1, which are as follow.

Battery internal resistance test: The internal resistance values of all the above-mentioned batteries were tested by an AC voltage drop internal resistance measurement method. That is, a small current of 1 kHz frequency and 50 mA was applied to the lithium batteries and then their voltages were sampled. After a series of processes such as rectification and filtering, the internal resistance values of the lithium batteries were calculated through an operational amplifier circuit.

Battery cycle life test: the test was carried out under a condition of 1C charge and discharge, the capacity of the battery after 300 cycles was tested through an electrochemical workstation, and the capacity retention rate was then calculated.

TABLE 1

Property test results of the products

| | Melting point ° C. | Apparent density g/mL | Inherent viscosity dL/g | Rotational viscosity mPa · s | Peel strength N/m | Battery internal resistance mΩ | Capacity retention rate % |
|---|---|---|---|---|---|---|---|
| Example 1 | 168.88 | 0.346 | 2.353 | 5658 | 27 | 41 | 85.1 |
| Example 2 | 170.34 | 0.428 | 2.356 | 5820 | 29 | 37 | 85.4 |
| Example 3 | 174.02 | 0.413 | 2.425 | 6374 | 33 | 35 | 87.1 |
| Example 4 | 169.61 | 0.547 | 2.398 | 6113 | 31 | 32 | 88.3 |
| Comparative example 1 | 172.36 | 0.356 | 2.336 | 5263 | 23 | 45 | 82.7 |
| Comparative example 2 | 171.25 | 0.407 | 2.267 | 4152 | 22 | 46 | 83.3 |
| Comparative example 3 | 171.73 | 0.384 | 2.339 | 5306 | 28 | 44 | 84.2 |
| Comparative example 4 | 170.55 | 0.435 | 2.267 | 4201 | 24 | 45 | 83.6 |
| JH-D2500 | 172.42 | 0.384 | 2.72 | 8500 | 6 | 38 | 31.6 |

Compared with the JH-D2500 copolymerized resin, the resin sample of this disclosure has a smaller rotational viscosity and a lower intrinsic viscosity, but because the resin of this disclosure contains more polar groups, it has better bonding performance. The bonding performance of the resin is characterized by the peel strength, which is 27 to 33 N/m. Practical applications in lithium ion batteries: the lithium ion battery using the resin of this disclosure has an internal resistance value similar to that of the lithium ion battery using JH-D2500; in the battery charge-discharge cycle test, the lithium ion battery using the resin of this disclosure has a higher capacity retention rate.

What is claimed is:

1. A polymerizable composition for lithium ion battery binders, by weight, comprising:
   85 to 99.5 parts of vinylidene fluoride monomer;
   0.5 to 15 parts of a comonomer;
   0.04 to 0.25 part of a pH buffer regulator;
   0.3 to 3 parts of a metallocene synergist;
   0.2 to 1.0 part of an initiator; and
   0.08 to 0.35 part of a dispersant.

2. The polymerizable composition for lithium ion battery binders according to claim 1, wherein by weight, the metallocene synergist comprises:
   0.01 to 0.5 part of 4'-phenyl-2,2':6',2"-terpyridine;
   0.1 to 1 part of cobalt isooctanoate;
   10 to 25 parts of vinylpyrrolidone;
   0.3 to 2 parts of vinylferrocene; and
   100 to 150 parts of dimethylchlorohydrosilane.

3. The polymerizable composition for lithium ion battery binders according to claim 1, wherein the dispersant is one of or a mixture of more than one of methyl cellulose, hydroxypropyl methyl cellulose, carboxymethyl cellulose, and methyl cellulose ether.

4. The polymerizable composition for lithium ion battery binders according to claim 1, wherein the pH buffer regulator is one of or a mixture of more than one of disodium dihydrogen phosphate, disodium hydrogen phosphate, sodium pyrophosphate, sodium bicarbonate, and ammonium acetate.

5. The polymerizable composition for lithium ion battery binders according to claim 1, wherein the initiator is one of or a mixture of more than one of diethylhexyl peroxydicarbonate, tert-butyl peroxyneodecanoate, diisopropyl peroxydicarbonate, lauryl peroxide, dibenzoyl peroxide, and tert-butyl peroxy-2-ethylhexanoate.

6. The polymerizable composition for lithium ion battery binders according to claim 1, wherein the comonomer is one of or a mixture of more than one of vinyl chloride, methyl methacrylate, 2-ethylhexyl acrylate, acrylic acid, methacrylic acid, acrylonitrile, methyl acrylate, butyl acrylate, butyl methacrylate, and 2-ethylhexyl methacrylate.

7. A preparation method of a copolymerized PVDF resin for lithium ion battery binders, comprising the following steps:
   (1) preparing reaction raw materials for later use: by weight, the reaction raw materials including: 300 to 600 parts of deionized water, 0.04 to 0.25 part of a pH buffer regulator, 85 to 99.5 parts of a VDF monomer, 0.5 to 15 parts of a comonomer, 0.3 to 3 parts of a metallocene synergist, 0.2 to 1.0 part of an initiator, and 0.08 to 0.35 part of a dispersant;
   (2) preparing an aqueous solution of the pH buffer regulator and an aqueous solution of the dispersant: combining the pH buffer regulator and 0.3 to 5 wt % of the deionized water to prepare the aqueous solution of the pH buffer regulator for later use; and combining the dispersant and 10 to 40 wt % of the deionized water to prepare the aqueous solution of the dispersant for later use;
   (3) adding remaining deionized water and the aqueous solution of the pH buffer regulator and the aqueous solution of the dispersant obtained in step (2) to a reactor, reducing a temperature in the reactor to 8 to 12° C., vacuumizing the reactor, and replacing with nitrogen to control an oxygen content in the reactor to ≤20 ppm;
   (4) adding the initiator, the comonomer, the metallocene synergist and 10 to 30 wt % of the VDF monomer to the reactor; and
   (5) heating the reactor up to 40 to 65° C. to carry out a polymerization reaction, and controlling a polymerization pressure at 5.5 to 8.0 MPa by adding remaining VDF monomer during the polymerization reaction; then, holding temperature of the reactor and continuing the polymerization reaction; when a reactor pressure drops to 4.0 MPa, cooling down to stop the polymerization reaction; recovering unreacted monomers, and then carrying out washing, filtering, and drying, thus obtaining the copolymerized PVDF resin.

8. The preparation method of the copolymerized PVDF resin for lithium ion battery binders according to claim 7, wherein by weight, the metallocene synergist is prepared by following method:

by weight, preparing 0.01 to 0.5 part of 4'-phenyl-2,2':6', 2"-terpyridine, 0.1 to 1 part of cobalt isooctanoate, 10 to 25 parts of vinylpyrrolidone, 0.3 to 2 parts of vinylferrocene, and 100 to 150 parts of dimethylchlorohydrosilane to carry out hydrosilylation for 1 to 5 h at 25 to 40° C. to obtain the metallocene synergist.

* * * * *